(12) United States Patent
Cipolla et al.

(10) Patent No.: US 8,910,541 B2
(45) Date of Patent: Dec. 16, 2014

(54) ELECTRONIC DEVICE WITH ANGLED CONTROL ORIENTATION

(75) Inventors: David Cipolla, Macedon, NY (US); Jose Ricardo Duran, Williamson, NY (US); Jason Scott, W. Henrietta, NY (US); Richard S. Currier, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 292 days.

(21) Appl. No.: 13/554,520

(22) Filed: Jul. 20, 2012

(65) Prior Publication Data
US 2014/0022711 A1 Jan. 23, 2014

(51) Int. Cl.
| | | |
|---|---|---|
| *H05K 5/00* | (2006.01) | |
| *H05K 7/00* | (2006.01) | |
| *G06F 1/16* | (2006.01) | |
| *G05G 1/10* | (2006.01) | |
| *H01H 3/08* | (2006.01) | |
| *H01H 19/00* | (2006.01) | |
| *H01H 19/14* | (2006.01) | |
| *H01H 21/00* | (2006.01) | |
| *H01H 1/00* | (2006.01) | |
| *H01H 9/00* | (2006.01) | |
| *H01H 13/62* | (2006.01) | |
| *H01H 1/16* | (2006.01) | |

(52) U.S. Cl.
USPC ............... 74/553; 361/679.01; 361/679.02; 200/336; 200/273; 200/564; 200/565; 200/566; 200/567

(58) Field of Classification Search
USPC ............ 361/679.01, 679.02, 679.55, 679.56; 455/575.1–575.9; 74/553; 200/336, 200/273, 564, 565, 566, 567
See application file for complete search history.

(56) References Cited

U.S. PATENT DOCUMENTS

| | | | |
|---|---|---|---|
| D238,098 | S | 12/1975 | Fink |
| D371,501 | S | 7/1996 | James |
| D379,809 | S | 6/1997 | Lindeman |
| D388,091 | S | 12/1997 | Lee et al. |
| D392,970 | S | 3/1998 | Guthan, Jr. |
| 5,784,688 | A | 7/1998 | Siddoway |
| 6,128,006 | A | 10/2000 | Rosenberg et al. |
| D448,019 | S | 9/2001 | Cebe et al. |
| D467,312 | S | 12/2002 | Singtoroj |
| D512,128 | S | 11/2005 | Zieger et al. |
| 2007/0287391 | A1* | 12/2007 | Hofer et al. ............ 455/90.3 |

* cited by examiner

*Primary Examiner* — Anthony Haughton
(74) *Attorney, Agent, or Firm* — Robert J. Sacco, Esq.; Fox Rothschild LLP (57) ABSTRACT

Systems and methods for packaging a Control Assembly ("CA") on an Electronic Device ("ED"). The methods involve: mounting a first component (112, 812, 908) of CA on a Top Surface ("TS") (104, 804, 904) of ED (100, 800, 900) such that a Central AXis ("CAX") (136, 836, 934) thereof is at an acute angle (170, 870, 962) relative to a plane (152, 852, 952) perpendicular to a horizontal center axis (150, 850, 950) of ED; mounting a second component (106, 806, 906) of CA on TS such that CAX (132, 832, 932) thereof is at a first Obtuse Angle ("OA") (164, 860, 960) relative to the plane; and mounting a third component (108, 808, 912) of CA on TS such that CAX (134, 834, 936) thereof is at a second OA (166, 862, 970) relative to the plane. The second or third component may have a trapezoidal shape.

9 Claims, 10 Drawing Sheets

ELECTRONIC DEVICE WITH ANGLED CONTROL ORIENTATION

BACKGROUND OF THE INVENTION

1. Statement of the Technical Field

The invention concerns electronic devices. More particularly, the invention concerns electronic devices comprising angled control orientation.

2. Description of the Related Art

Electronic devices having external controls for facilitating user operation thereof are well known in the art. Such electronic devices include, but are not limited to, mobile phones and handheld radios. The external controls may include keypads, trackballs, buttons, scroll wheels, Optical Finger Navigation ("OFN") devices, rotary knobs and switches. One or more of the external controls is often located at or adjacent to the top of the electronic device. Accordingly, a user of the external device can access at least some of the external controls when the electronic device is attached to a belt, or situated on a support in an upright position.

SUMMARY OF THE INVENTION

Embodiments of the present invention concern systems and methods for packaging a control assembly on an electronic device. The methods involve mounting a first component of the control assembly on a top surface of the electronic device such that a central axis thereof is at an acute angle relative to a plane perpendicular to a horizontal center axis of the electronic device. The top surface may be planar or convex. A second component of the control assembly is mounted on the top surface such that a central axis thereof is at a first obtuse angle relative to the plane. Similarly, a third component of the control assembly is mounted on the top surface such that a central axis thereof is at a second obtuse angle relative to the plane. The first and second obtuse angles can be the same or different. The third component can be shaped such that a distance between respective top portions of the second and third components is the same as a distance between respective bottom portions of the second and third components. In this regard, the third component may have a trapezoidal shape. A fourth component of the control assembly may be on the top surface such that a central axis is perpendicular to the plane. The first, second, third and fourth components are each configured to facilitate user control of operations of the electronic device.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Embodiments of the present invention will now be described with respect to FIGS. 1-9. Embodiments of the present invention generally concern portable electronic devices having external controls disposed at or adjacent to a top thereof. The external controls include knobs, antenna connectors, buttons and cable connectors. The external controls are mounted on a curved top surface of the portable electronic device. The external controls (e.g., knobs) are easily accessible due to the shape and curvature of the top surface on which they are mounted. For example, cables can be easily coupled/decoupled to/from a cable connector mounted on the curved top surface. Once coupled to the cable connector, it will not interfere with user operation of the electronic device or limit how a user can wear the electronic device (e.g., via a holster, a belt clip, etc. . . . ). Similarly, the placement of the antenna on the curved top surface ensures that an antenna will not interfere with user operation of the portable electronic device, yet will assist with use of an emergency button in a "tactile use only" operation. Also, the emergency button is located on the top surface such that it is not obscured by other external controls.

In some embodiments of the present invention, at least one of the external controls has an "angled orientation" relative to a plane perpendicular to a horizontal center axis of the portable electronic device. More particularly, at least one external control has a central axis at an acute or obtuse angle with respect to said plane. Also, one of the external controls may have a trapezoidal shape such that a distance between respective top portions of adjacent controls is the same as a distance between respective bottom portions of said adjacent controls.

The "angled orientation" and/or trapezoidal shape facilitate optimization of a users experience by eliminating typical usability issues found with controls located at the top of portable electronic devices. Such usability issues include: difficulty of knob manipulation when wearing gloves and/or when the portable electronic device is being worn by a user; connector, cable and/or antenna interference with user operation of the portable electronic device; obscuration of emergency buttons by other external actuators or controls; and difficulty of cable and Input/Output ("I/O") connector attachment when the portable electronic device is being worn by the user.

Figure 1:
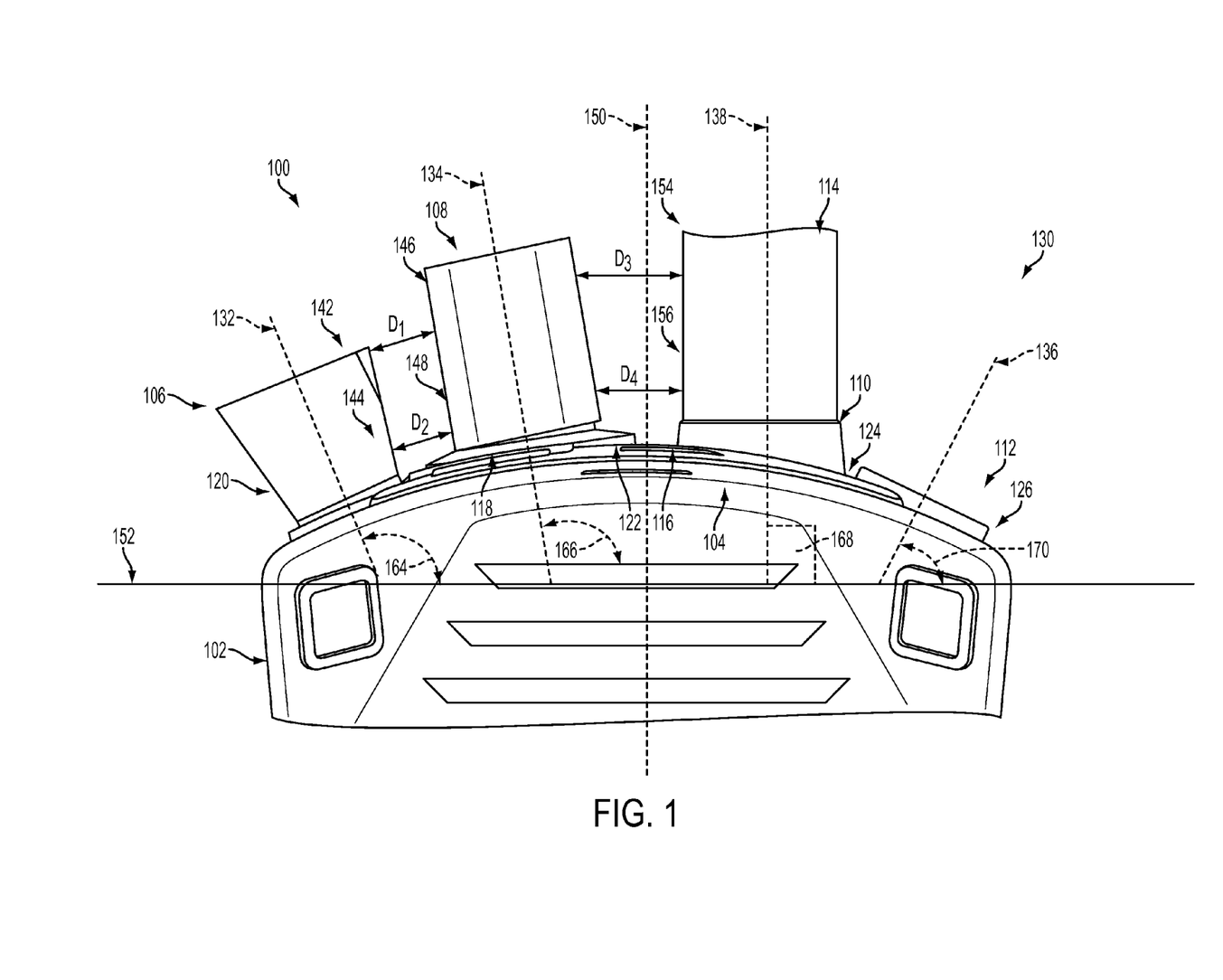
FIG. 1 is a schematic illustration of a cut away portion of an exemplary electronic device.

Referring now to FIG. 1, there is provided a schematic illustration of a cut away portion of an exemplary electronic device 100. Although the electronic device 100 is shown in FIG. 1 to be a portable radio, the invention is not limited in this regard. For example, the electronic device 100 can be a radio, a mobile telephone, a cellular telephone, an MP3 player, a personal computer, a PDA, a game pad, a video camera, a recording device, a camera, a GPS device or any other electronic device having actuators or controls at or adjacent to a top portion thereof.

The electronic device 100 has a control assembly for enabling user control of operations thereof. The control assembly comprises, but is not limited to, rotary knobs 106, 108, an antenna connector 110, a cable connector 112, an emergency button 116, and a Light Emitting Diode ("LED") 118. The cable connector 112 is located on a top portion 130 of the electronic device 100 to allow for better cable dressing on a user's body when the electronic device 100 is in a holster or mounted on a belt. In this regard, the cable connector's 112 location on the top portion 130 ensures that a cable being coupled thereto or decoupled therefrom will not wrap around other components of the control assembly. Additionally, because the cable connector 112 is tangent on a curved top surface 104, it makes access easy for coupling and decoupling of a cable (not shown).

The LED 118 is placed on the top portion 130 such that it can be viewed from the top and front of the electronic device 100. The emergency button's 116 placement of the top portion 130 ensures that it is fully accessible and can be operated via a "no visual, tactile use only" method. The "no visual, tactile use only" method involves allowing a user to guide his/her hand down an antenna 114 for locating the emergency button 116. The location of the emergency button 116 relative to the antenna 114 also protects it from being accidentally tripped when a user is rotating a knob 106, 108, coupling/decoupling antenna 114 to/from antenna connector 110, coupling/decoupling a cable to/from cable connector 112, and/or coupling/decoupling the electronic device 100 from a user and/or a support. In embodiments of the present invention, the emergency button 116 is placed as close to the antenna connector 110 as possible such that its distance from an edge of the electronic device 100 is optimized.

Each of the components 106-112 is disposed on the top portion 130 of the electronic device 100 in an "angled orientation" manner such that it is easily accessible to a user thereof when the user is wearing gloves, when the electronic device 100 is being worn by the user (i.e., the electronic device 100 is attached to a belt or inserted into a holster), and/or when the electronic device is situated on a support in an upright position. The "angled orientation" manner in which the components 106-112 are arranged on the top portion 130 will become evident as the discussion progresses.

The electronic device 100 also has internal circuitry (not shown) for communicating radio frequency signals to and from remotely located devices via an antenna 114. The internal circuitry (not shown) is electrically connected to the external controls 106-112 of the control assembly. Such electrical connections facilitate the user control of operations of the electronic device using the components 106-112 of the control assembly.

The electronic device 100 further comprises a housing 102 configured to house the internal circuitry (not shown), a battery (not shown), and other electronic components (not shown). Housing 102 can be formed from any conductive or non-conductive material. Such conductive materials include, but are not limited to, metal materials and composite materials. Such non-conductive materials include, but are not limited to, rubbers and plastics. In some embodiments, the housing material is selected to withstand high temperatures and/or harsh environmental conditions such that the internal components of the electronic device 100 are protected from damage due to external factors.

The housing 102 has a plurality of apertures formed through a convex top surface 104 thereof. Each of the apertures has a component 106-112 of the control assembly at least partially disposed therein. For example, control knobs 106, 108 are disposed in respective apertures 120, 122. An antenna connector 110 is disposed in aperture 124. A cable connector 112 is disposed in aperture 126. Each of the components 106-112 may be at least partially formed of the same or different material as the housing. In any case, the components 106-112 may be formed of a material that can withstand high temperatures and/or harsh environmental conditions. Also, watertight seals (not shown) can be provided between each of the components 106-112 and sidewalls (not shown) of the respective aperture 120-126 via a chemical bond, a mechanical bond and/or a gasket seal.

Figure 2:
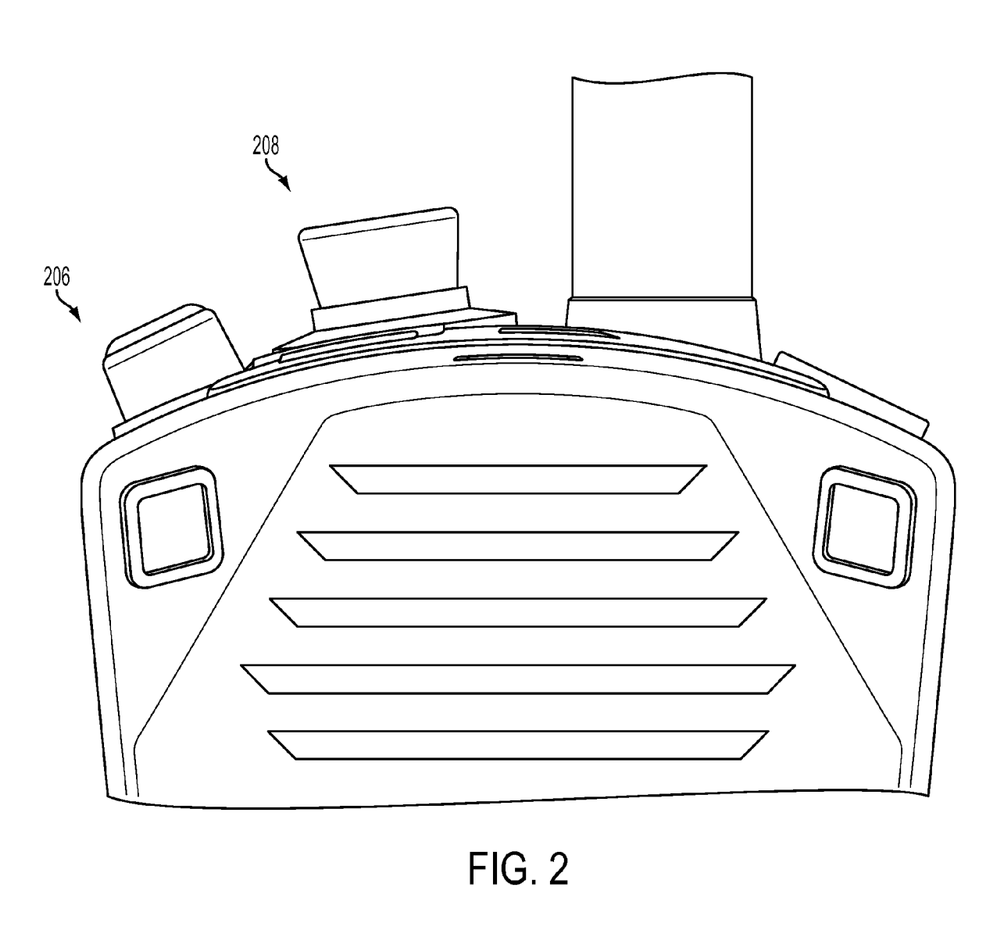
FIG. 2 is a schematic illustration of a cut away portion of another exemplary electronic device.
Figure 3:
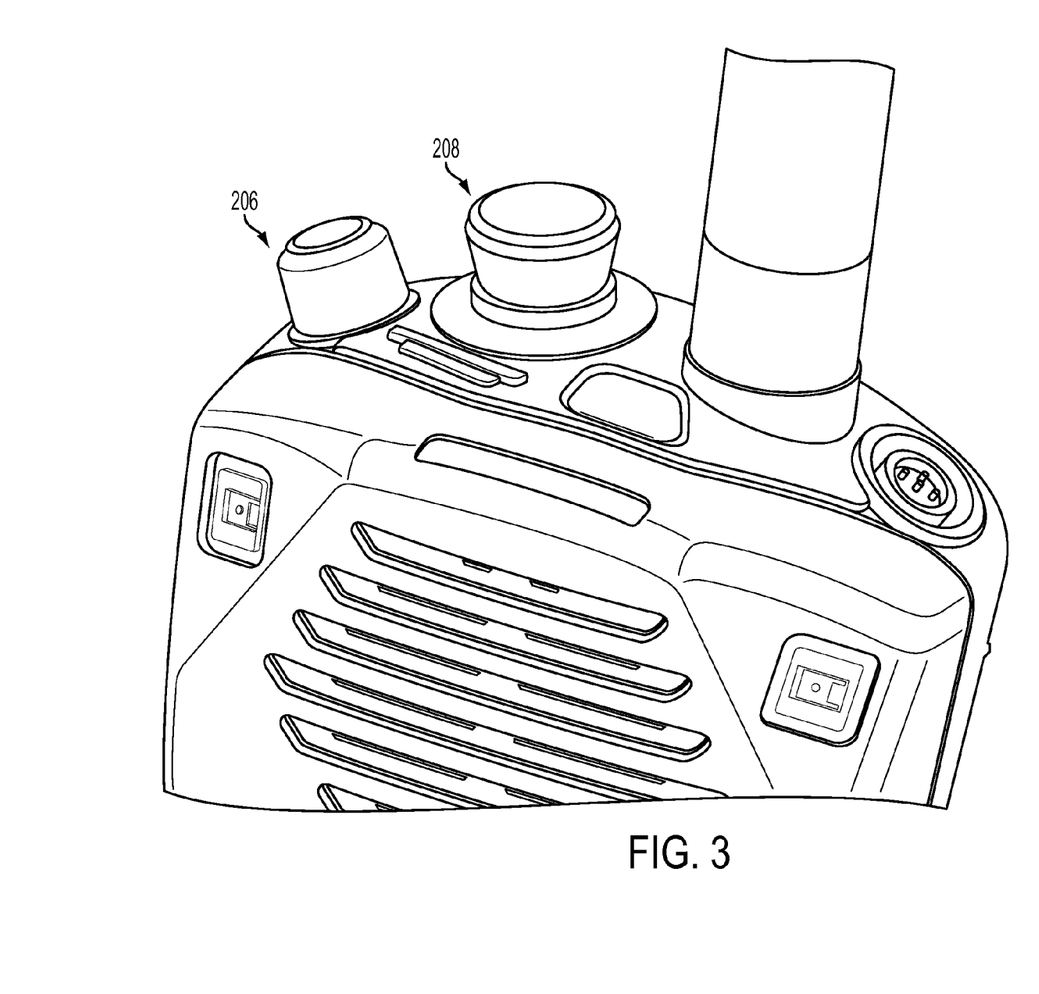
FIG. 3 is a perspective view of the cut away portion of the electronic device shown in FIG. 2.
Figure 4:
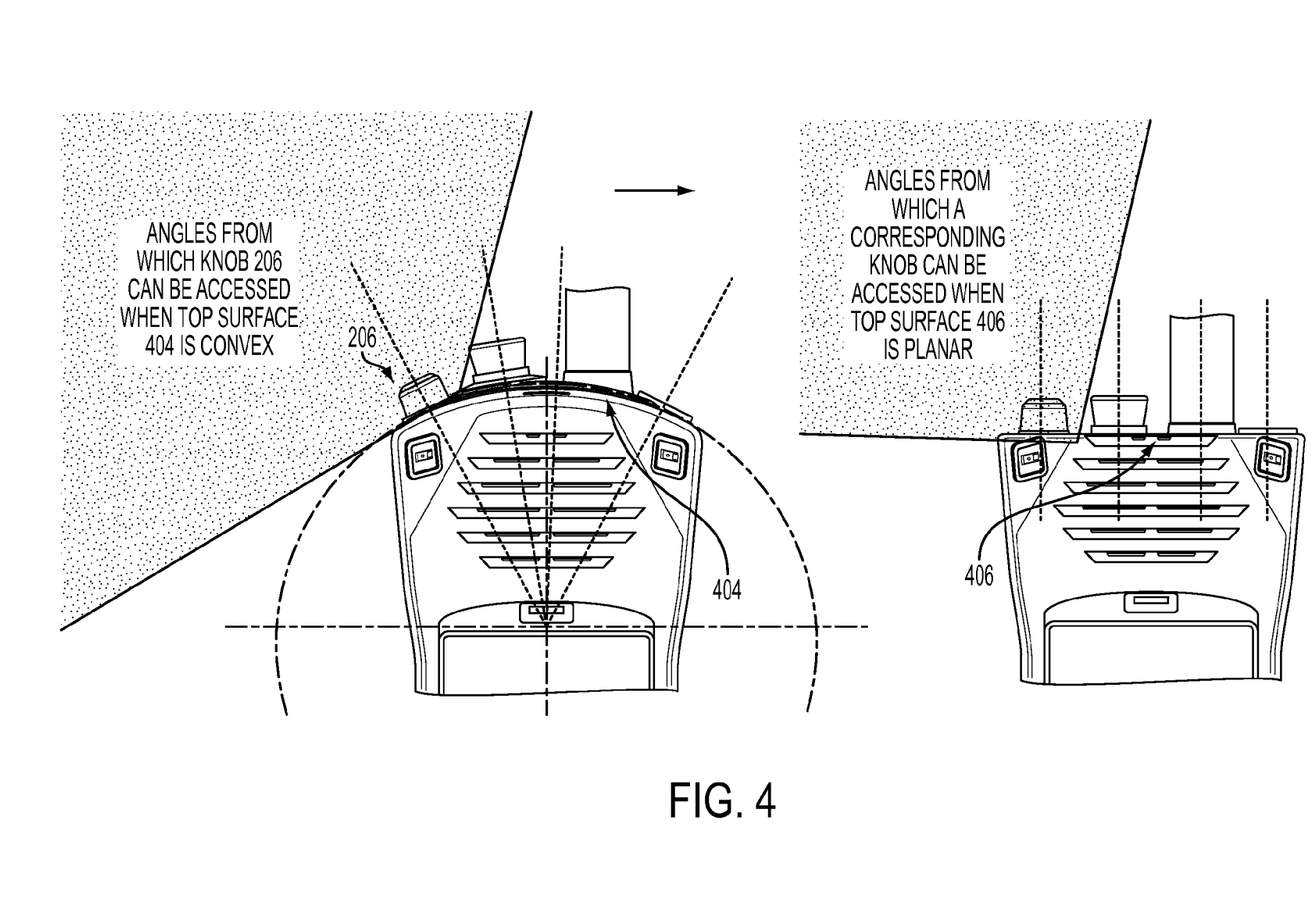
FIGS. 4-7 each provide a schematic illustration of a range of angles from which components of an electronic device having a curved top surface and an electronic device having a planar top surface can be accessed.
Figure 5:
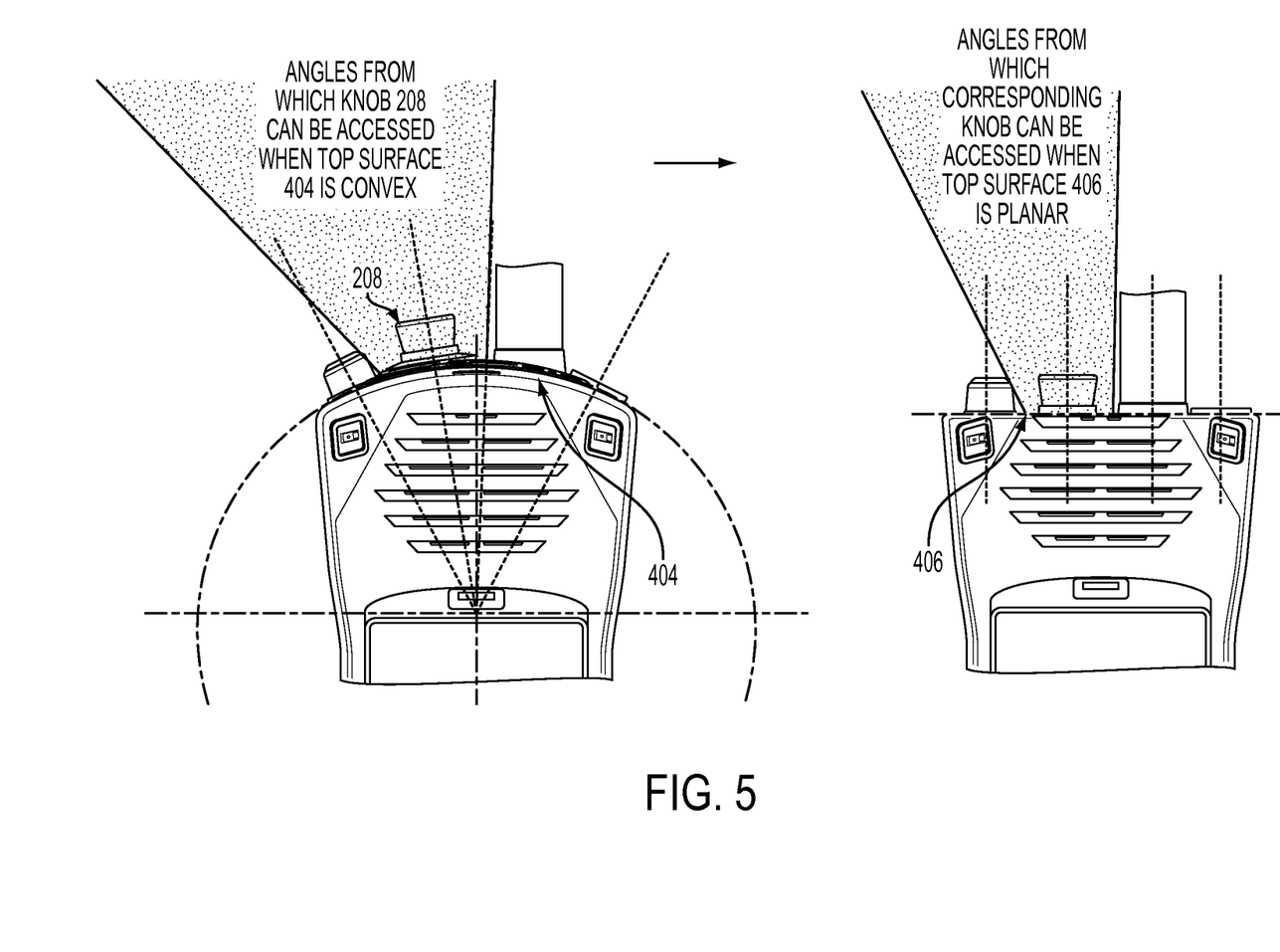
Figure 6:
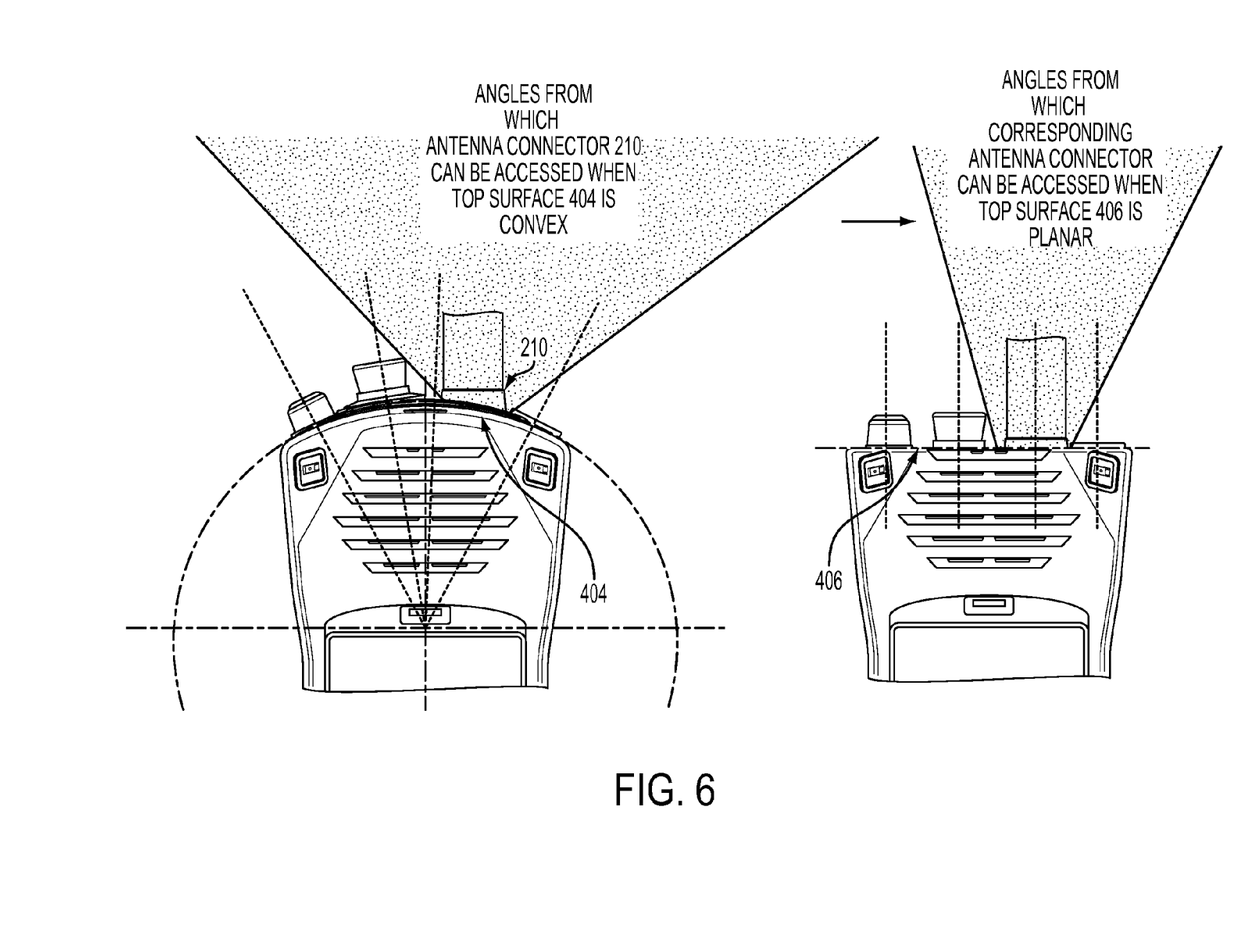
Figure 7:
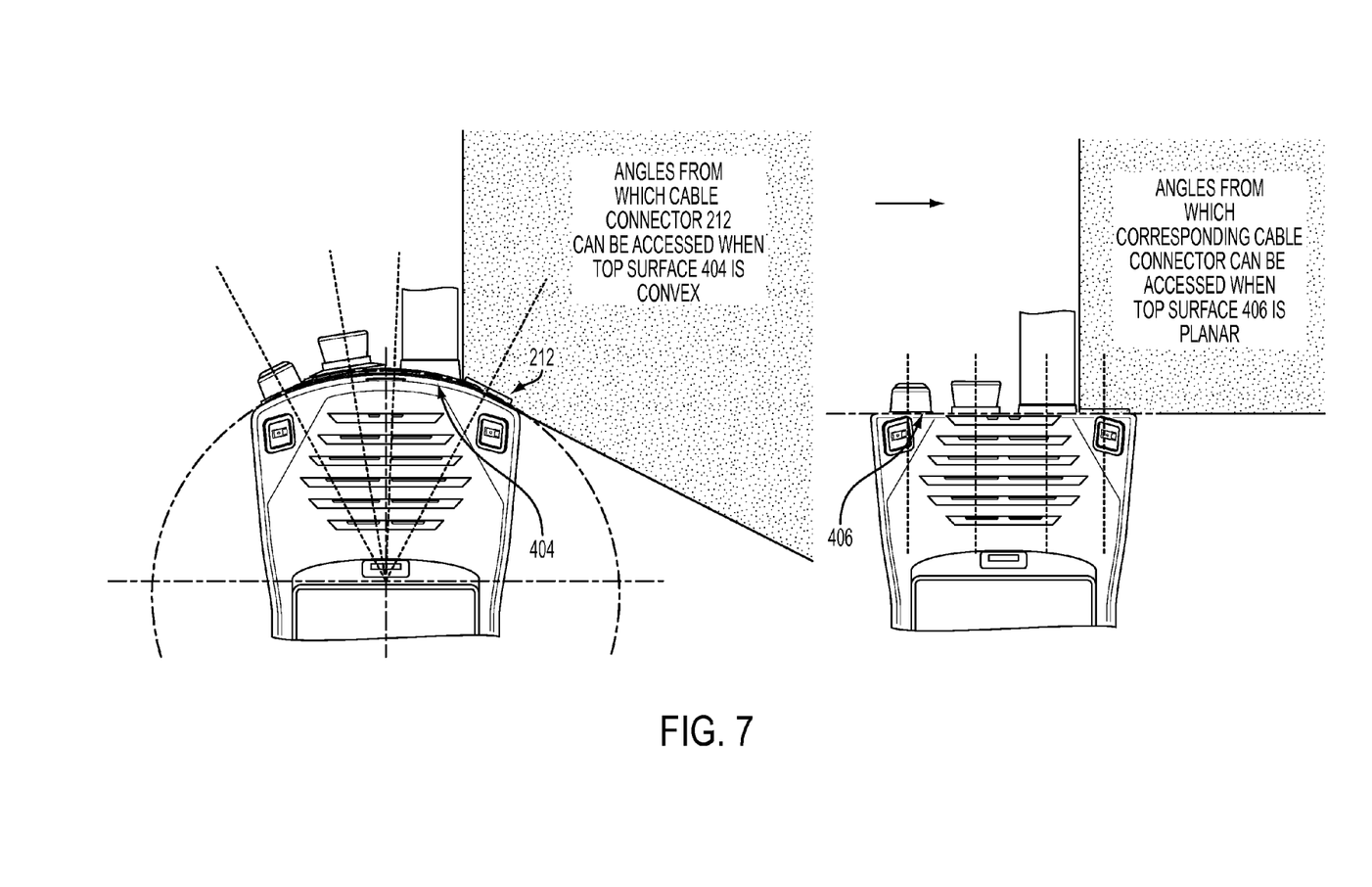

As shown in FIG. 1, each of the components 106, 108, 112 has an "angled orientation" relative to a plane 152 perpendicular to a horizontal center axis 150 of the electronic device 100. More particularly, cable connector 112 has a central axis 136 at an acute angle 170 with respect to plane 152. In contrast, each of the rotary knobs 106, 108 has a central axis 132, 134 at an obtuse angle 160, 162 with respect to plane 152. The obtuse angles 160, 162 of the rotary knobs 106, 108 may be the same or different. In either scenario, one of the rotary knobs 106, 108 has a trapezoidal shape such that a distance $D_1$ between top portions 142, 146 of the adjacent rotary knobs 106, 108 is the same as a distance $D_2$ between bottom portions 144, 148 of the adjacent rotary knobs 106, 108. For example, as shown in FIG. 1, the outside rotary knob 106 of the adjacent pair of knobs 106, 108 has a trapezoidal shape. In contrast, as shown in FIGS. 2-3, an inside rotary knob 208 of an adjacent pair of knobs 206, 208 has a trapezoidal shape. Notably, a trapezoidal shaped knob mounted on a curved surface 404, as opposed to a planar surface 406, optimizes access of components 206, 208, 210, 212 from a plurality of angles, as show in FIGS. 4-7. Users of the electronic device 100 access the knobs 206, 208 as if they are mounted in two independent planes. This enhances "no visual, tactile only use", as well as gloved operation.

As also shown in FIG. 1, the antenna connector 110 has a central axis 138 that is perpendicular to plane 152, i.e., has an angle 172 of ninety degrees relative to plane 152. Consequently, a distance $D_3$ between top portions 146, 154 of adjacent components 108, 110 is different than a distance $D_4$ between bottom portions 148, 156 of the adjacent components 108, 110.

Figure 8:
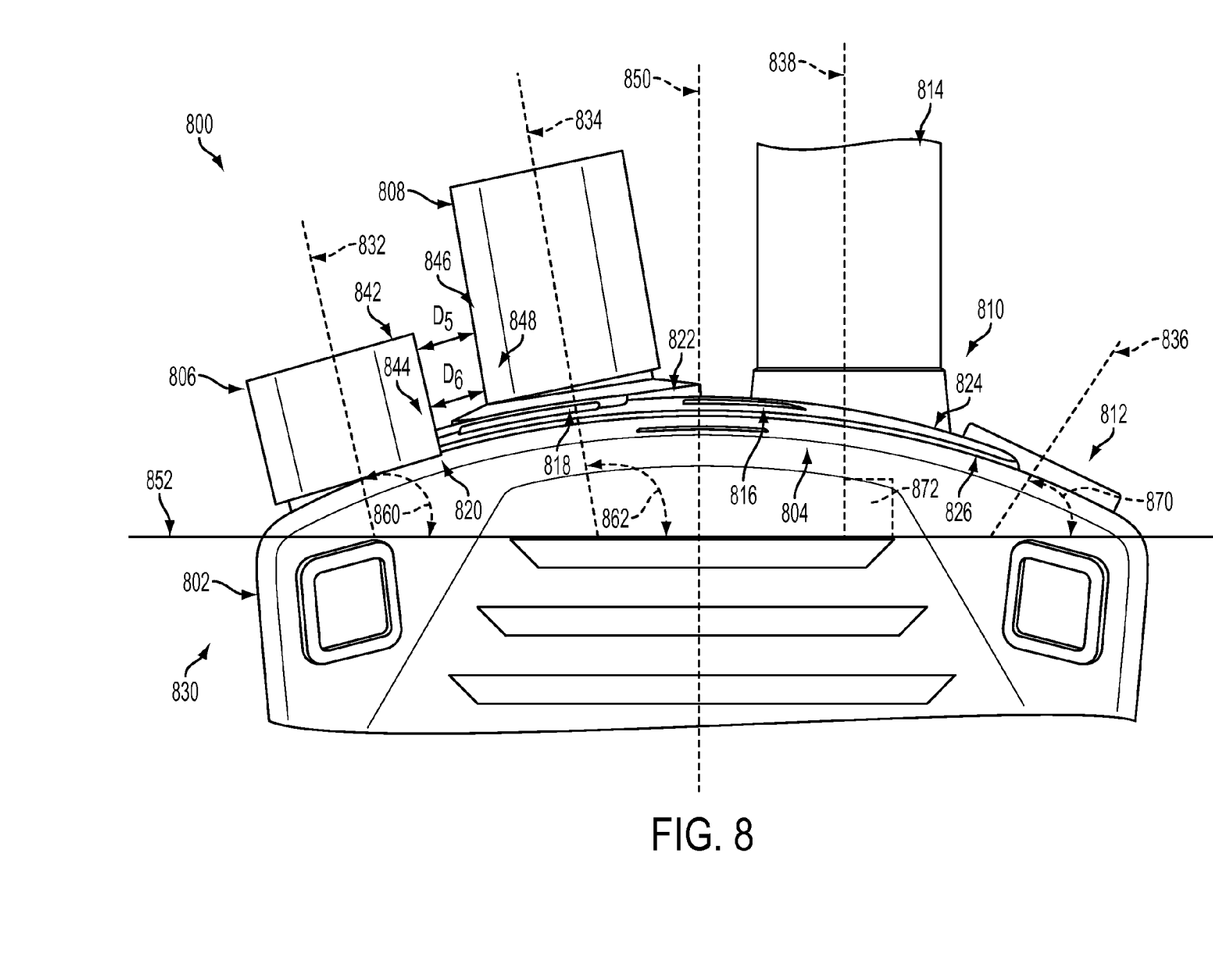
FIG. 8 is a schematic illustration of a cut away portion of another exemplary electronic device.

Referring now to FIG. 8, there is provided a schematic illustration of a cut away portion of another exemplary electronic device 800. Although the electronic device 800 is shown in FIG. 8 to be a portable radio, the invention is not limited in this regard. For example, the electronic device 800 can be a radio, a mobile telephone, a cellular telephone, an MP3 player, a personal computer, a PDA, a game pad, a video camera, a recording device, a camera, a GPS device or any other electronic device having actuators or controls at or adjacent to a top portion thereof.

The electronic device 800 has a control assembly for enabling user control of operations thereof. The control assembly comprises, but is not limited to, rotary knobs 806, 808, an antenna connector 810, a cable connector 812, an emergency button 816, and a Light Emitting Diode ("LED") 818. The cable connector 812 is located on a top portion 830 of the electronic device 800 to allow for better cable dressing on a user's body when the electronic device 800 is in a holster or mounted on a belt. In this regard, the cable connector's 812 location on the top portion 830 ensures that a cable being coupled thereto or decoupled therefrom will not wrap around other components of the control assembly. Additionally, because the cable connector 812 is tangent on a curved top surface 804, it makes access easy for coupling and decoupling of a cable (not shown).

The LED 818 is placed on the top portion 830 such that it can be viewed from the top and front of the electronic device 800. The emergency button's 816 placement of the top portion 830 ensures that it is fully accessible and can be operated via a "no visual, tactile use only" method. The "no visual, tactile use only" method involves allowing a user to guide his/her hand down an antenna 814 for locating the emergency button 816. The location of the emergency button 816 relative to the antenna 814 also protects it from being accidentally tripped when a user is rotating a knob 806, 808, coupling/decoupling antenna 814 to/from antenna connector 810, coupling/decoupling a cable to/from cable connector 812, and/or coupling/decoupling the electronic device 800 from a user and/or a support. In embodiments of the present invention, the emergency button 816 is placed as close to the antenna connector 810 as possible such that its distance from an edge of the electronic device 800 is optimized.

Each of the components 806-812 is disposed on the top portion 830 of the electronic device 800 in an "angled orientation" manner such that it is easily accessible to a user thereof when the user is wearing gloves, when the electronic device 800 is being worn by the user (i.e., the electronic device 800 is attached to a belt or inserted into a holster), and/or when the electronic device is situated on a support in an upright position. The "angled orientation" manner in which the components 806-812 are arranged on the top portion 830 will become evident as the discussion progresses.

The electronic device 800 also has internal circuitry (not shown) for communicating radio frequency signals to and from remotely located devices via an antenna 814. The internal circuitry (not shown) is electrically connected to the external controls 806-812 of the control assembly. Such electrical connections facilitate the user control of operations of the electronic device using the components 806-812 of the control assembly.

The electronic device 800 further comprises a housing 802 configured to house the internal circuitry (not shown), a battery (not shown), and other electronic components (not shown). Housing 802 can be formed from any conductive or non-conductive material. Such conductive materials include, but are not limited to, metal materials and composite materials. Such non-conductive materials include, but are not limited to, rubbers and plastics. In some embodiments, the housing material is selected to withstand high temperatures and/or harsh environmental conditions such that the internal components of the electronic device 800 are protected from damage due to external factors.

The housing 802 has a plurality of apertures formed through a convex top surface 804 thereof. Each of the apertures has a component 806-812 of the control assembly at least partially disposed therein. For example, control knobs 806, 808 are disposed in respective apertures 820, 822. An antenna connector 810 is disposed in aperture 824. A cable connector 812 is disposed in aperture 826. Each of the components 806-812 may be at least partially formed of the same or different material as the housing. In any case, the components 806-812 may be formed of a material that can withstand high temperatures and/or harsh environmental conditions. Also, watertight seals (not shown) can be provided between each of the components 806-812 and sidewalls (not shown) of the respective aperture 820-826 via a chemical bond, a mechanical bond and/or a gasket seal.

As shown in FIG. 8, the antenna connector 810 has a central axis 838 that is perpendicular to plane 852, i.e., has an angle 872 of ninety degrees relative to a plane 852. Each of the components 806, 808, 812 has an "angled orientation" relative to the plane 852 perpendicular to a horizontal center axis 850 of the electronic device 800. More particularly, cable connector 812 has a central axis 836 at an acute angle 870 with respect to plane 852. In contrast, each of the rotary knobs 806, 808 has a central axis 832, 834 at an obtuse angle 860, 862 with respect to plane 852. The obtuse angles 860, 862 of the rotary knobs 806, 808 are the same. Consequently, a distance $D_5$ between top portions 842, 846 of the adjacent rotary knobs 806, 808 is the same as a distance $D_6$ between bottom portions 844, 848 of the adjacent rotary knobs 806, 808.

Figure 9:
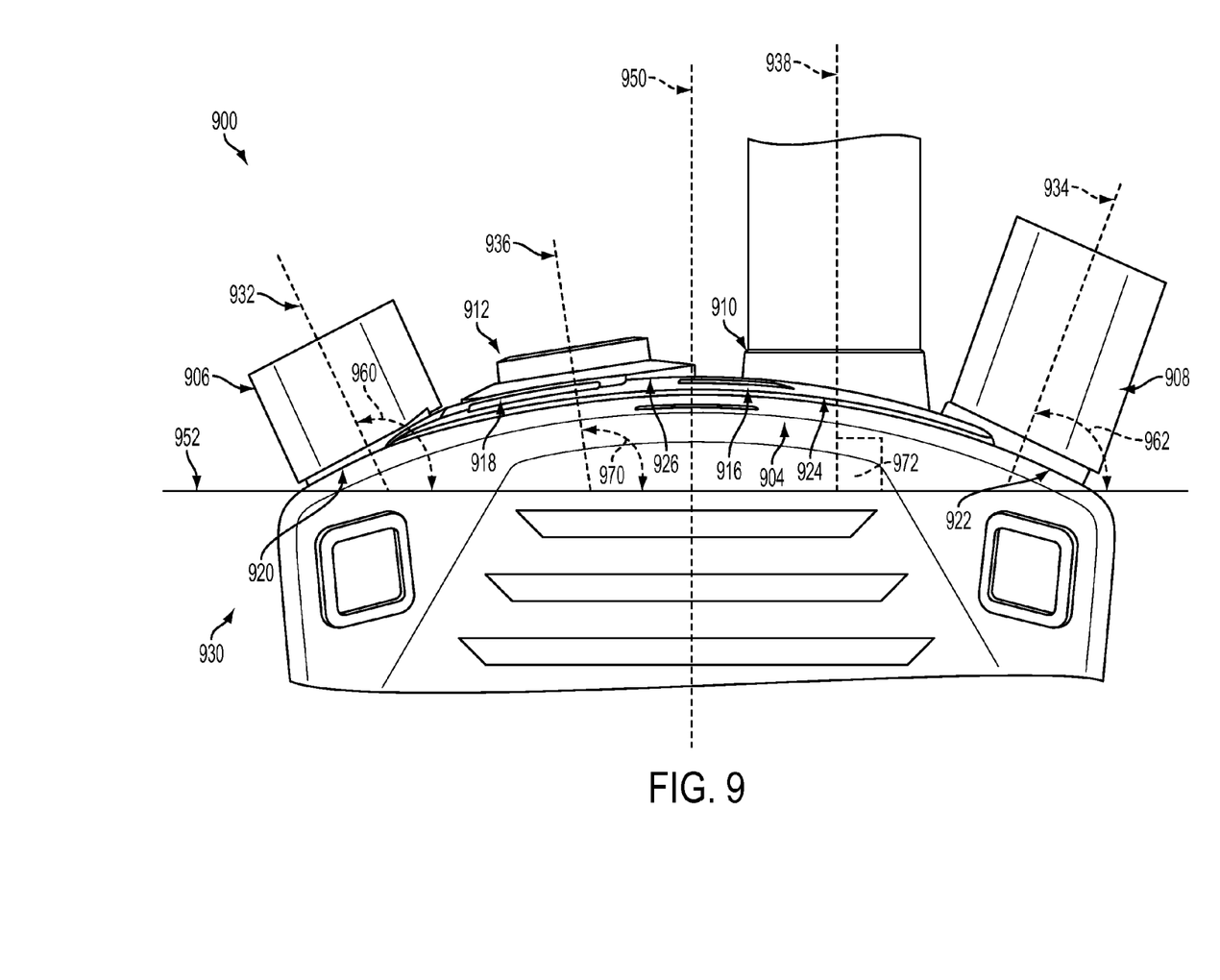
FIG. 9 is a schematic illustration of a cut away portion of yet another exemplary electronic device.

Referring now to FIG. 9, there is provided a schematic illustration of a cut away portion of another exemplary electronic device 900. Although the electronic device 900 is shown in FIG. 9 to be a portable radio, the invention is not limited in this regard. For example, the electronic device 900 can be a radio, a mobile telephone, a cellular telephone, an MP3 player, a personal computer, a PDA, a game pad, a video camera, a recording device, a camera, a GPS device or any other electronic device having actuators or controls at or adjacent to a top portion thereof.

The electronic device 900 has a control assembly for enabling user control of operations thereof. The control assembly comprises, but is not limited to, rotary knobs 906, 908, an antenna connector 910, a cable connector 912, an emergency button 916, and a Light Emitting Diode ("LED") 918. The cable connector 912 is located on a top portion 930 of the electronic device 900 to allow for better cable dressing on a user's body when the electronic device 900 is in a holster or mounted on a belt. In this regard, the cable connector's 912 location on the top portion 930 ensures that a cable being coupled thereto or decoupled therefrom will not wrap around other components of the control assembly. Additionally, because the cable connector 912 is tangent on a curved top surface 904, it makes access easy for coupling and decoupling of a cable (not shown).

The LED 918 is placed on the top portion 930 such that it can be viewed from the top and front of the electronic device 900. The emergency button's 916 placement of the top portion 930 ensures that it is fully accessible and can be operated via a "no visual, tactile use only" method. The "no visual, tactile use only" method involves allowing a user to guide his/her hand down an antenna 914 for locating the emergency button 916. The location of the emergency button 916 relative to the antenna 914 also protects it from being accidentally tripped when a user is rotating a knob 906, 908, coupling/decoupling antenna 914 to/from antenna connector 910, coupling/decoupling a cable to/from cable connector 912, and/or coupling/decoupling the electronic device 900 from a user and/or a support. In embodiments of the present invention, the emergency button 916 is placed as close to the antenna connector 910 as possible such that its distance from an edge of the electronic device 900 is optimized.

Each of the components 906-912 is disposed on the top portion 930 of the electronic device 900 in an "angled orientation" manner such that it is easily accessible to a user thereof when the user is wearing gloves, when the electronic device 900 is being worn by the user (i.e., the electronic device 900 is attached to a belt or inserted into a holster), and/or when the electronic device is situated on a support in an upright position. The "angled orientation" manner in which the components 906-912 are arranged on the top portion 930 will become evident as the discussion progresses.

The electronic device 900 also has internal circuitry (not shown) for communicating radio frequency signals to and from remotely located devices via an antenna 914. The internal circuitry (not shown) is electrically connected to the external controls 906-912 of the control assembly. Such electrical connections facilitate the user control of operations of the electronic device using the components 906-912 of the control assembly.

The electronic device 900 further comprises a housing 902 configured to house the internal circuitry (not shown), a battery (not shown), and other electronic components (not shown). Housing 902 can be formed from any conductive or non-conductive material. Such conductive materials include, but are not limited to, metal materials and composite materials. Such non-conductive materials include, but are not limited to, rubbers and plastics. In some embodiments, the housing material is selected to withstand high temperatures and/or harsh environmental conditions such that the internal components of the electronic device 900 are protected from damage due to external factors.

The housing 902 has a plurality of apertures formed through a convex top surface 904 thereof. Each of the apertures has a component 906-912 of the control assembly at least partially disposed therein. For example, control knobs 906, 908 are disposed in respective apertures 920, 922. An antenna connector 910 is disposed in aperture 924. A cable connector 912 is disposed in aperture 926. Each of the components 906-912 may be at least partially formed of the same or different material as the housing. In any case, the components 906-912 may be formed of a material that can withstand high temperatures and/or harsh environmental conditions. Also, watertight seals (not shown) can be provided between each of the components 906-912 and sidewalls (not shown) of the respective aperture 920-926 via a chemical bond, a mechanical bond and/or a gasket seal.

As shown in FIG. 9, the antenna connector 910 has a central axis 938 that is perpendicular to plane 952, i.e., has an angle 972 of ninety degrees relative to a plane 952. Each of the components 906, 908, 912 has an "angled orientation" relative to the plane 952 perpendicular to a horizontal center axis 950 of the electronic device 900. More particularly, cable connector 912 has a central axis 936 at an obtuse angle 970 with respect to plane 952. Rotary knobs 906 has a central axis 932 at an obtuse angle 960 with respect to plane 952. The obtuse angels 960, 970 can be the same or different. In contrast, rotary knob 908 has a central axis 934 at an obtuse angle 962 with respect to plane 952.

Figure 10:
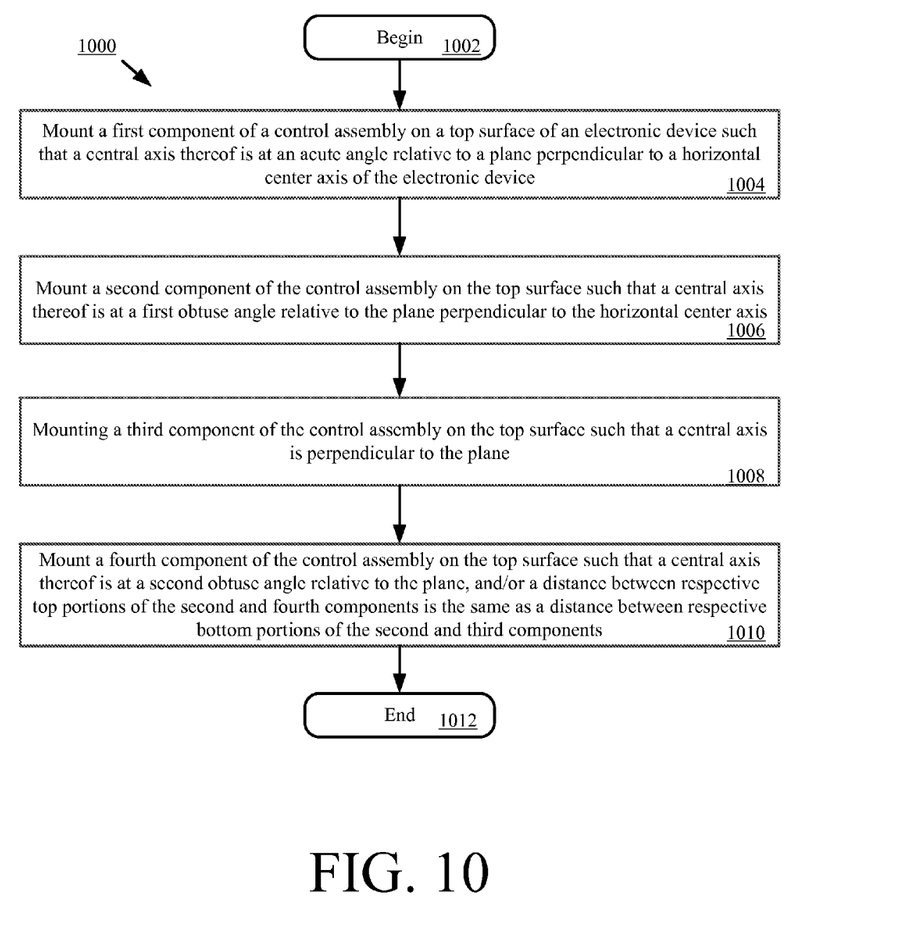
FIG. 10 is a flow diagram of an exemplary method for packaging a control assembly on an electronic device.

Referring now to FIG. 10, there is provided a flow diagram of an exemplary method 1000 for packaging a control assembly on an electronic device (e.g., electronic device 100 of FIG. 1). As shown in FIG. 10, the method 1000 begins with step 1002 and continues with step 1004. Step 1004 involves mounting a first component (e.g., component 112, 812 or 908 of FIG. 1, 8 or 9) of a control assembly on a top surface (e.g., convex top surface 104, 804 or 904 of FIG. 1, 8 or 9) of the electronic device such that a central axis (e.g., central axis 136, 836 or 934 of FIG. 1, 8 or 9) thereof is at an acute angle (e.g., angle 170, 870 or 962 of FIG. 1, 8 or 9) relative to a plane (e.g., plane 152, 852 or 952 of FIG. 1, 8 or 9) perpendicular to a horizontal center axis (e.g., axis 150, 850 or 950 of FIG. 1, 8 or 9) of the electronic device. The first component is configured to facilitate user control of operations of the electronic device Upon completing step 1004, step 1006 is performed where a second component (e.g., component 106, 108, 806, 808, 906 or 912 of FIG. 1, 8 or 9) of the control assembly is mounted on the top surface such that a central axis (e.g., central axis 132, 134, 832, 834, 932 or 936 of FIG. 1, 8 or 9) thereof is at a first obtuse angle (e.g., angle 164, 166, 860, 862, 960 or 970 of FIG. 1, 8 or 9) relative to the plane perpendicular to the horizontal center axis. The second component is configured to facilitate user control of operations of the electronic device.

In a next step 1008, a third component (e.g., component 110, 810 or 910 of FIG. 1, 8 or 9) of the control assembly is mounted on the top surface such that a central axis thereof (e.g., central axis 138, 838 or 938 of FIG. 1, 8 or 9) is perpendicular to the plane. Thereafter, a fourth component (e.g., component 108, 808 or 912 of FIG. 1, 8 or 9) of the control assembly is mounted on the top surface such that a central axis (e.g., central axis 134, 834 or 936 of FIG. 1, 8 or 9) thereof is at a second obtuse angle (e.g., angle 166, 862 or 970 of FIG. 1, 8 or 9) relative to the plane. The second obtuse angle can be the same as or different than the first obtuse angle. Also, the fourth component can be shaped such that a distance (e.g., distance $D_1$ of FIG. 1 or $D_5$ of FIG. 8) between respective top portions (e.g., top portions 142, 146 of FIG. 1 or 842, 846 of FIG. 8) of the second and fourth components is the same as a distance (e.g., distance $D_2$ of FIG. 1 or $D_6$ of FIG. 8) between respective bottom portions (e.g., bottom portions 144, 148 of FIG. 1 or 844, 848 of FIG. 8) of the second and fourth components. In some embodiments, the second component or fourth component has a trapezoidal shape.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

We claim:

1. An electronic device, comprising:
   a housing having a top surface, a bottom surface opposed from the top surface, and four sidewall surfaces connected between the top and bottom surfaces, where the top surface has a convex shape pointing out and away from the housing;
   a first control component mounted on said top surface so as to protrude out and away therefrom, and such that a central axis thereof is at an acute angle relative to a plane perpendicular to a horizontal center axis of said electronic device so as to pass through the four sidewall surfaces;
   a second component mounted on said top surface so as to protrude out and away therefrom, and such that a central axis thereof is at a first obtuse angle relative to said plane;
   an antenna connector mounted on said top surface so as to protrude out and away therefrom, and such that a central axis thereof is perpendicular to said plane, where a distance between first ends of the antenna connector and the second component is different as compared to a distance between second ends of the antenna connector and the second connector;
   wherein said first and second components are each configured to facilitate user control of operations of said electronic device.

2. The electronic device according to claim 1, further comprising a third component mounted on said top surface such that a central axis thereof is at a second obtuse angle relative to said plane.

3. The electronic device according to claim 2, wherein said first and second obtuse angles are the same.

4. The electronic device according to claim 2, wherein said first and second obtuse angles are different.

5. The electronic device according to claim 2, wherein said third component is shaped such that a distance between respective top portions of said second and third components is the same as a distance between respective bottom portions of said second and third components.

6. The electronic device according to claim 5, wherein said third component has a trapezoidal shape.

7. An electronic device, comprising:
   a housing having a top surface, a bottom surface opposed from the top surface, and four sidewall surfaces connected between the top and bottom surfaces, where the top surface has a convex shape pointing out and away from the housing;
   a first control component mounted on said top surface so as to protrude out and away therefrom, and such that a central axis thereof is at a first obtuse angle relative to a plane perpendicular to a horizontal center axis of said electronic device so as to pass through the four sidewall surfaces;
   a second component mounted on said top surface so as to protrude out and away therefrom, and such that a central axis thereof is at a second obtuse angle relative to said plane perpendicular to said horizontal center axis, said second obtuse angle being the same as or different than said first obtuse angle;
   an antenna connector mounted on said top surface so as to protrude out and away therefrom, and such that a central axis thereof is perpendicular to said plane, where a distance between first ends of the antenna connector and the first component is different as compared to a distance between second ends of the antenna connector and the first component;
   wherein said first and second components are each configured to facilitate user control of operations of said electronic device.

8. The electronic device according to claim 7, further comprising a third component mounted on said top surface such that a central axis is perpendicular to said plane.

9. The electronic device according to claim 7, wherein said second component has a trapezoidal shape.

* * * * *